UNITED STATES PATENT OFFICE 2,012,328

PARASITICIDES AND INSECTICIDES AND METHOD OF MAKING THE SAME

William Hunter Volck, Watsonville, Calif., assignor to California Spray-Chemical Corporation, Berkeley, Calif., a corporation of Delaware No Drawing. Application September 23, 1932, Serial No. 634,565

11 Claims. (Cl. 167—43)

The invention relates to parasiticidal and insecticidal emulsions of oil in water adaptable for use as sprays to control insects and other parasites and pests on orchard trees and vegetation in general.

Parasiticidal oil emulsions heretofore employed have used oils, such as various petroleum fractions, both volatile and non-volatile, viscous and non-viscous, impure and carefully purified. These have been made up both as dilute and concentrated emulsions containing as high as 80% oil and often diluted for spraying until they contain from about 1 to about 10% of oil. When unpurified oils were used they were generally emulsified by a considerable excess of fixed alkali soaps, whale oil preferred, to insure stability of the emulsions. When the substantially non-volatile viscous oils substantially free from phytocidal impurities, commonly called phytonomic oils, came into use, it was soon found possible to greatly reduce the waste of oil by making quick-breaking emulsions with alkaline caseinates and similar emulsifiers with 30 or more parts of water to 1 of oil, which reverted practically on contact with leaves, or fruit, or like surfaces.

The fixed alkali soaps were often injurious to foliage or fruit when allowed to dry thereon, and, unless a great excess of soap was used, the soap and the emulsion were destroyed by the varying and uncertain hardness of the natural waters so the leaves and fruit would be irregularly oiled with an injurious excess. I have found that in treating citrus trees infested with red scale, that when the application of spray was heavy enough to insure a satisfactory kill of the red scale on the trunk and branches, there was danger of getting so much oil on the leaves and fruit as to make the fruit rinds appear greasy and interfere with the regular processes of handling in the packing houses. In order to overcome these objectionable effects on foilage and fruit, the percentage of oil could be reduced, more volatile oils could be used, or the amount of emulsifier could be increased. In each case, however, it was found that when the objectionable effects were sufficiently reduced or practically eliminated, the amount of oil deposited on the bark of the twigs and branches did not insure a proper kill of the scale thereon and it became desirable to follow spraying with a supplementary treatment as by fumigation.

I have discovered that the heavier oil coating on leaves and fruit, as compared with the coating on the bark of twigs and branches, appears to be due to difference in structure of the two classes of surfaces; the fruit and leaves of citrus trees having a smooth glass-like surface which seems to attract the oil and break the usual emulsions, whereas the bark of the twigs and branches is rough, porous, and studded with cork-like growths which seem to absorb water, repel the oil and retard or prevent breaking the emulsion in contact therewith, allowing the oil to drain away. This oil shedding action of bark is sometimes further intensified by the presence of growths of moss and lichens which make it necessary to apply to them enough oil to soak through them when the water of the emulsion has evaporated. I have further discovered that the killing of parasites, such as red scale, which are frequently located underneath these growths, is further complicated by the fact that the shell of the insect is often tightly attached to the bark all around it and that this bark is porous and oil-absorbent when the water of the emulsion has been taken up or evaporated, and thus the oil is taken away by the bark before it reaches the insect's body within the shell, but that the scale insects so located can be reached and killed by practically saturating the porous bark around and under them with oil emulsion.

One object of the invention is an insecticide emulsion which is capable of depositing a sufficient coating of oil for pest control, either on foliage and fruit, or on stems and branches or else on both at the will of the operator, without in any case depositing an objectionable excess of oil on either. This I attain by using a very small amount of soap, e. g., a small fraction of a percent based on the water and avoiding the excess formerly deemed necessary to render the soap emulsions safe and stable. Too much soap causes excessive drainage from leaves and fruit, whereas its absence prevents adequate oiling of the bark. Emulsion water in this condition having between about $\frac{1}{10}$% and about 1/300% of excess soap, I call "soapy water" to distinguish it from solutions of soap containing in previous practice a large fraction of a percent and often several percent of soap. These large amounts of soap were deemed necessary because smaller amounts of soap were often found to be insufficient and it was not realized that the natural hardness of water actually destroyed an unknown and variable proportion, if not all, of the soap used. Nor was it realized that the amount of soap present and active in the emulsions as sprayed should be limited to a definite range of very small amounts; that on the one hand there would result from too much soap a great waste of oil and failure to kill the parasites;

whereas on the other hand there would result from too little soap excessive and injurious oiling of the foliage and fruit.

A second object of my invention, therefore, is complete neutralization of the hardness of the water, e. g. by reaction with some softening agent, such as soap, which may be partially consumed and destroyed in the neutralization, so that the desired small quantity of active soap remaining thereafter may produce the required degree of soapiness in the emulsion water. Even a comparatively slight excess of soapiness over that required to soften the water may not only induce excessive run off of oil but also increase the toxicity of the emulsion to plant tissue. However, the fruit rind spotting produced by the concentration of fixed alkali soaps in evaporating drops is only eliminated by the use of weak alkali soaps such as ammonia soaps.

A third object of my invention, therefore, is to provide a soap or combination of soaps that shall minimize or eliminate this risk, no matter how heavy a spraying may be called for by the demands of pest control. To this end I have discovered that strong fixed alkalies, such as soda and potash, while not usually injurious in the neutralized or hardened soap, may sometimes be the cause of "spotting" in the free soap, even in such small quantities as are required to produce mere soapiness, whereas soaps of weak bases are less likely to produce such spotting, particularly these weak soaps of chemically saturated fatty acids like stearic acid.

A fourth object of my invention is to further avoid any such risk of "spotting" or other injury by the use of a weak base which is specially volatile, e. g. ammonia, the soaps of which are alkaline emulsifiers in the presence of excess of ammonia but during drying become sufficiently acid to dissolve in or attract the oil and cause spreading of the final drops of the emulsion on drying in such thin films that all damage to plant or fruit is avoided.

My invention may be more fully understood and explained by reference to, and comparison of, the following examples.

*Example I.*—To utilize an ordinary ready made quick-breaking casein type of emulsion of a suitable phytonomic oil, I may first place in the spray mixing tank provided with an agitator, a suitable quantity of an ordinary hard water and add thereto just enough of a water soluble soap to overcome the hardness of the water and leave an excess of dissolved soap not substantially exceeding about .018% or 1/60% on the weight of water used, to make the water just slightly "soapy". The amount required of the particular soap used may be determined by titrating a definite quantity of the water against a soap solution of known strength, or may be roughly determined by gradually adding the soap to the water being agitated in the tank until the hardness of water has been just overcome and the desired slight permanent "soapiness" is established. When the proper quantity of soap is all dissolved I then stir in the desired quantity (say 4 gallons per 96 of "soapy water") of the quick-breaking casein type emulsion until it is uniformly distributed in the "soapy water". Other types of oil emulsion may be used provided they contain no emulsifiers or other constituents incompatible with the particular soap used and its proper performance of its function of making the water and later the emulsion of oil therein just slightly "soapy", without relying entirely on the soap in solution for the emulsifying action.

*Example II.*—To a "soapy water" prepared as in Example I, I may add a proper quantity of any oil or mixture of oils suitable for the purpose in hand, preferably in most cases phytonomic oil in the proportion of about 3 parts per 97 of "soapy water". The oil is best added gradually with vigorous agitation, but may be emulsified in the soapy water solution by any suitable mechanism.

In either of the above examples the ordinary soaps may with proper care be used, and may be formed from oleic or stearic or other fatty acid with alkali, but may preferably consist at least in part of stearic acid soap with ammonia as the base, since I have also discovered that the stearic-ammonia soaps show a decided tendency to better deposition of oil than do other ammonia soaps. When I speak of ammonia soaps I mean the ammoniacal and soapy solution of the fatty acids with a suitable quantity of ammonia, preferably with an excess of ammonia.

*Example III.*—A convenient method of preparing the soap solution itself prior to the addition of the emulsion or emulsified oil, and quite within the purview of the invention, is to add separately the saponifiable materials to the water in the tank and produce the soap in situ. To the water in the spray tank with the agitator in motion I may add enough oleic acid (red oil) to produce, when saponified, sufficient soap to overcome the hardness of the water and give an excess of water soluble soap equal to about ¼ pound per 100 gallons of relatively hard water, or about 0.036% by weight, preferably less for a relatively soft water, e. g. about ⅛ pound per 100 gallons or about .018%. After the oleic acid has been thoroughly mixed with the water, alkali is added to saponify it, preferably about 1 volume of 26° Bé. ammonia for each volume of oleic acid added. To the resulting solution of ammoniacal ammonium oleate soap, either emulsified oil as stated in Ex. I may be added or, with vigorous agitation, a suitable oil may be emulsified as in Ex. II.

*Example IV.*—Also the process and product of the invention may be exemplified by the saponification of the fatty acid, production of soap, neutralization of hardness, leaving a slight excess of soap and production of oil emulsion in soapy water, all in the presence of the oil and during its dispersion. Suppose a batch of 300 gallons of finished emulsion is to be made for spraying lemon trees in southern California where they are infested with California red scale and the available water has a natural hardness of about 362 parts per million, requiring about 1.8 pounds of oleic ammonia soap per 100 gallons of water for neutralization. I may take about 9 gallons of technical white oil from California crude from which unsaturates have been substantially removed by treatment, e. g. with sulfuric acid, the finished oil having a viscosity of about 105 seconds Saybolt at 100° F. With the 9 gallons of white oil I mix about 3 quarts of a good grade of red oil (commercial oleic acid) having a low ester value. This will make about 5.939 pounds of ammonium oleate. 5.202 pounds of this will be required to soften the 289 gallons of hard water. This leaves .737 pound of ammonium oleate to 289 gallons as free excess soap or .255 pound/100 gallons of water. The mixture of white oil and red oil is then added to about 289 gallons of hard water in the spray mixing tank with the agitator running and time allowed for the oil to become fairly well dispersed by the agitation. Then 3 quarts of 26° Bé. ammonia are added and the agitation continued till a homogeneous emulsion results which will be ready for use at once, containing about .030% of excess soap.

*Example V.*—If an unusually stable product (emulsion) is desired it is easily obtained by a slight modification of the procedures illustrated in the two preceding examples, whereby the fatty acid is introduced in two steps in two different ways. The oleic-ammonia soap solution is made up first as in Ex. III but enough of the oleic acid is withheld to equal about 1% of the weight of the oil to be used. This leaves the aqueous soap solution distinctly alkaline with ammonia. The oleic acid withheld is then dissolved in the oil before the oil is added to the aqueous soap solution and emulsified. It will be understood that the excess ammonia present in the soap solution acts on the small percentage of oleic in the oil to saponify it at the oil-water interface as emulsification proceeds and a more stable emulsion results than if the entire content of oleic were saponified prior to the addition of the oil.

*Example VI.*—The required soap including the excess may be obtained in whole or part in any one of the following ways or a combination thereof.

a. By adding a soap or soap solution to the water in the spray tank in such amounts that the hardness of the water is neutralized and the excess necessary to control the penetration, wetting and depth of the oil film is secured.

b. By adding fatty acid to the oil in amounts sufficient to give this excess soap when added to soft alkaline water (natural or artificial).

c. By adding only enough fatty acid to the oil to insure its easy emulsification when mixed with the alkaline soaped water.

To make 100 gallons of spray with relatively hard water, I may fill the tank with water, allowing sufficient space for the oil and soap, and then add the soap until the hardness has been neutralized and the water becomes soft. I may then add a small additional quantity of soap to insure soapiness in the order of ¼ pound of free soap to 100 gallons of water. To the water thus rendered soapy I may then add oil in amounts dependent on the use for which the spray is intended, e. g. 1% to 4% in summer sprays and 2% to 10% in winter sprays. For example, a dormant or winter spray intended to kill San Jose scale, I may use 3 to 4 gallons of a dormant oil to 100 gallons of spray. Such dormant oil may be any one of a number of light lubricating stocks ordinarily used for such purposes. After the addition of the oil, the whole mixture is stirred into a usable emulsion by the mechanical agitation in the spray tank and is applied as a spray after the usual practice.

This procedure may be modified by adding a small quantity of fatty acid to the oil, in the order of 1% of the total volume of oil. Such an oil is added to the soft water which in this case should contain a suitable amount of alkali. The reaction between the dissolved fatty acid and this alkali in the soft water causes the oil to break up into an emulsion and insures proper emulsification even if the agitation in the spray tank is very slow and inefficient.

By supplying a suitable soap or soap liquid, preferably an ammonia soap of a fatty acid, or more specifically a mixture of oleic and stearic acids which contains an excess of ammonia, I may enable men in the field to just soften water of any degree of hardness without any inconvenience or chemical examination of the water in the field and I can then supply a prepared phytonomic oil containing oleic acid in proper quantity to provide the soapiness when added to the softened water. I may thus carry out my invention by causing to be prepared an emulsion for use on citrus trees in fruit with precisely the same results as described in the other examples.

Oleic acid is mentioned as being the easiest of the fatty acids to obtain and to mix conveniently. When conveniently obtainable, however, normal saturated fatty acid, such as stearic, is sometimes preferable as it appears to act even in fixed alkali soaps somewhat like the ammonia, to insure the freedom from fruit spots when used in the small quantities of free soap described, i. e. from about $\frac{1}{75}$% to about $\frac{1}{300}$% on the weight of the water. Stearic acid also has the advantage of giving better deposition of oil in the sense that a thicker and more effective oil film is produced.

The desirable proportions of free or excess soap in the water vary slightly with the composition of the soap. Oleic acid soap appears to be much more effective in the minute quantities than is stearic. On the other hand, a larger excess of stearic acid soap can be used without producing "run off", too much loss of oil, or too low a kill. Practically, however, stearic acid is rarely used by itself so I will describe the preferred excess soap required to produce a soapy water or cause soapiness, more particularly with respect to oleic acid and its soaps. In summer sprays the ratio of excess soap to water varies from about .006% to .036% with softer waters having a hardness below 335 parts per million and from about .012% to .072% with waters of greater hardness. In winter there is less necessity of protecting foliage, so slightly less soap may be used and there is less danger of losing oil because stems and bark are more aborbent than leaves so somewhat more soap can be used. In winter, or dormant sprays, therefore, I prefer to use from about .0036% to .045% for softer waters less than 335 hardness, and about .018% to .090% for harder waters.

Generally my preference is for about .018% for the softer waters and about .036% for the harder waters.

Since this highly beneficial use of only certain small proportions of excess soap appears to be a surface tension effect small amounts of certain impurities or special materials that may be present, or added as camouflage, may modify or shift this range considerably without departing from the use of my invention. The range previously given, however, is the practical working range that has proven effective with usual commercial materials and will serve as a guide to any one desiring to practice legitimately the invention.

It has been found that emulsions prepared according to the foregoing examples, or variations thereof within the scope of the invention, are consistent and uniform in functioning regardless of the varying hardnesses of water employed which has hitherto altered the characteristics of emulsion sprays as ordinarily prepared to render them ineffective or inefficient in performance. Ordinarily a somewhat higher concentration of oil is used in this new type of emulsion than for the usual quick-breaking emulsion for equal depth of oil film but this apparent disadvantage is largely compensated for by the more uniform spreading and effectiveness of the oil film applied, as indicated by actual observations of the results obtained by the respective types of sprays, and may be further compensated for by the use of ammonium stearate soap, giving a better deposition of the oil. The emulsion sprays of the invention in which due allowance for the hardness of the water is made by using a quantity of soap or soap-forming materials to just neutralize the natural hardness of the water and then supply a very small excess of water-soluble soap, produce a more uniform deposit of oil over the entire tree surface, including the rough bark surfaces and the bark undergrowths of moss and lichens, than any of the sprays heretofore used. Also the depth of this oil deposit may be regulated by adjusting the proportion of the oil in the emulsion spray, and the distribution between leaves of fruit, as compared with stems and twigs, may be regulated by the degree of excess soap in the diluting water. The bark of trees sprayed with the new type of emulsion retains a dark and greasy appearance for days or even weeks after the application. Apparently the oil deposited from the new type of spray remains at or near the bark surface and is not so much subject to deep absorption or breaking and ruin of the surface so that there is left a sufficient amount to penetrate under the protecting shells of the scale insects. As indicated, the effectiveness of an oil spray for killing scale insects largely depends on the retention of oil on or adjacent the shells of the insects for sufficient time to penetrate beneath and reach the body of the insect itself.

The presence of water soluble soap in the diluted spray greatly increases the wetting power of the emulsion and causes it to actually penetrate growths of moss and lichens and apply a coating of oil to the bark beneath. This wetting and spreading effect tends to distribute the oil according to the actual amount of the emulsion retained. As the rough and spongy surface of the bark tends to retain a deeper film of emulsion than the smooth surfaces of the leaves and fruit the final oil deposit is greater on the twigs and branches than on the fruit and foliage per unit area. Thus emulsions of the invention when applied in sufficient quantity to produce an effective deposit on the bark of the trees, do not leave an excessive oil film on fruit and foliage so that the objectionable greasing of the fruit or smothering of the foliage are practically eliminated.

In the past there has been at times a tendency for drops of emulsion to accumulate on the under surface of the fruit itself and as the water content was dissipated, these drops exhibited the qualities of oil and highly concentrated solutions of the emulsifier. When the emulsions containing substantial quantities of fixed alkali soap were used on citrus trees, the drops containing such concentrated soap caused unsightly deposits or blemishes on the under surface of the fruit rinds, due to the penetration of soap into the cells just under the rind surface. The present invention utilizing emulsions containing soap contemplates among other things the ability to avoid any such concentrated soap accumulations on the fruit. This result is obtained because, in the first place, the ammonia soaps of fatty acids are as effective for emulsification and application as the caustic alkaline soaps, but do not produce injurious concentrations on evaporation of the water content; in the second place, the percentage of residual soap is only a small fraction of a percent; and in the third place, stearic acid or similar saturated acid is preferred to other fatty acids and may be used when additional security is needed. I believe that, when an emulsion of oil containing an ammonia soap is sprayed on a surface, the excess ammonia evaporates and the character of the soap changes, becoming acid in reaction and no longer water soluble so that it more nearly resembles an oil than a soap. Instead of becoming more alkaline and more soapy as the water evaporates, the ammonia soap deposits lose all alkalinity and become less soapy. Even when formed the oily residues of ammonia soap emulsions do not remain concentrated in the form of large drops, but tend to creep out and spread over more extended surfaces so that not only the injurious character of the residues but also their physical concentration is reduced. In any event, whatever explanation may be given for the observed phenomenon, it is a fact that citrus fruit spotting is entirely prevented by the use of ammonia soaps instead of fixed alkali soaps in the manufacture of emulsion sprays in the process of the present invention. Also it is a fact that in my experience the use of saturated fatty acids, such as stearic, and the soaps made therefrom reduces or eliminates the injury to the plant by leaf-drop.

It has been explained that, in general, the conditions surrounding the successful use of an oil spray emulsion manufactured in accordance with the invention are satisfied when enough soap has been used to neutralize the hardness of the water and there is also provided a limited slight excess of free or water soluble soap to make the water soapy. Excellent results have been obtained with waters of medium hardness on this basis. Theoretically, pure water with the same actual quantity of excess soap should give identical performance, but actual experiment indicated that soft waters produced lighter oil deposits and consequently reduced kills of scale. This leads to the theory that the insoluble lime or magnesium salts resulting from the addition of soap to hard water may react with the mineral oil of the emulsion to produce greases which raise the viscosity of the oil and increase the depth of the oil film.

It may be pointed out that when different fatty acids are used in soap, different amounts of soap will be necessary to soften the same hard water. Thus 1.8 lbs. of ammonium oleate softens 100 gallons of the water in Example IV while only 1.64 lbs. of ammonium palmitate would be required. In producing soapiness however, the difference between saturated and unsaturated fatty acids is more marked and substantially greater proportions of saturated fatty acid soaps are required.

While the most specifically detailed example of the present invention has been addressed to the control of red scale on citrus trees, the procedures described are equally applicable to the control of other scale insect infestations, red spiders and their eggs, and insects and insect eggs, either on citrus or deciduous trees or on vegetation in general. While in the examples certain proportions of oil and water are given as satisfactory for making up emulsions in accordance with the invention, it should be understood that more or less oil may be employed without departing from the spirit of the invention, depending on the desired concentration of oil deposit for the particular spraying problem involved.

Since the desired result i. e. a controlled distribution of the parasiticidal oil deposit, is obtained by means of controlling the free soap in the water with which spray is applied, the elements of the novelty which constitute this invention are present in any coordination of the means, oil, soap or its components acid and alkali, with or without water, which is adapted to result when properly used, in the excess of free soap in the water as sprayed which I have found to be the means of controlling the deposit.

It will be apparent to one skilled in the art that the product of this invention can exist in several forms. So long as the right excess of free soap in the emulsion as sprayed is obtained, no particular order of addition is essential except as a matter of convenience.

From the specific examples and the above explanation, it is apparent that the product of my invention can exist as oil and effective fatty acid (i. e. fatty acid or soap) the effective acid being in proportion adapted to produce both the softening and the required soapiness when the oil is mixed with the water of that region or in proportion to produce only the soapiness when mixed with softened water; or else it may exist as a composite article of commerce consisting of a suitable soap mixture adapted to produce the softening of such water accompanied by the oil containing only the proportion of effective fatty acid adapted to produce the soapiness without the addition of alkali; or else the soap may also contain the proper proportion of free alkali (preferably ammonia) to just neutralize the acid in the oil and leave a suitable excess; or it may exist as a combination already made by mixing the contents of the oil-acid package and the soap-alkali package to produce a substantially solid emulsion; or it may exist as an aqueous emulsion (containing more or less water) to which water of any prearranged degree of hardness suitable thereto may be added in quantity desired to make up any concentration of emulsion; or finally it may exist as the emulsion when ready to spray. Thus in giving and in claiming proportions of soap to water, I wish these proportions to be read and interpreted or converted in the light of the state of completion of the final emulsion, as will be clearly understood by any one skilled in the art.

While particular methods and ingredients have been described for carrying out the process of the invention it is to be understood that the invention is not limited thereby. My invention embraces all variations and modifications within the scope of the following appended claims.

I claim:

1. The step in the method of manufacturing a parasiticidal emulsion spray of oil and water which comprises dispersing the oil in water with an ammonia soap.

2. The method of making phytonomic emulsions of oil in water which consists in supplying a completely soft water, rendering the water soapy with only a small fraction of a percent of ammonia soap and dispersing a phytonomic oil throughout such soapy water in the form of an emulsion.

3. The process of making phytonomic emulsions of oil in water which consists in supplying a completely soft water, adding only a small fraction of a percent of ammonium stearate to the water and dispersing a phytonomic oil throughout such soapy water in the form of an emulsion.

4. The process of making phytonomic emulsions of oil in water which consists in supplying a completely soft water, supplying thereto the components of about $\frac{1}{8}$ to 1 pound of ammoniacal ammonia soap per 100 gallons of total water to be used, and dispersing a phytonomic oil through such soapy water in the form of an emulsion.

5. The method of manufacturing an insecticidal emulsion spray of phytonomic oil and water which comprises saponifying oleic acid with ammonia in the presence of the oil and the water.

6. The method of manufacturing an insecticidal emulsion spray of a substantially non-volatile viscous mineral oil substantially free from phytocidal ingredients, and water which comprises mixing the oil with oleic acid in an amount sufficient, when saponified by means of an alkali, to neutralize the natural hardness of the water and to provide an excess of free soap of approximately $\frac{1}{4}$ pound per 100 gallons of water, adding the water thereto and finally adding an amount of ammonia sufficient to saponify the oleic acid.

7. A parasiticidal spray comprising an emulsion of a substantially non-volatile viscous mineral oil substantially free from phytocidal ingredients, water and an ammonia soap of a fatty acid.

8. The method of making parasiticidal emulsions of oil in water which consists in supplying a completely soft water, rendering the water soapy with only $\frac{1}{10}\%$ to $\frac{1}{300}\%$ of an ammonia soap and dispersing a parasiticidal oil throughout such soapy water in the form of an emulsion.

9. The method of manufacturing an insecticidal emulsion spray of oil and water which comprises rendering the water soft with an ammonia soap in amount sufficient to overcome the natural hardness of the water and to provide an excess of free ammonia soap of approximately $\frac{1}{4}$ pound per 100 gallons of water in which the oil is emulsified when sprayed.

10. The method of manufacturing an insecticidal emulsion spray of oil and water which comprises rendering the water soapy with an amount of an ammonia soap slightly in excess of that necessary to overcome the natural hardness of the water and incorporating an emulsion of the oil therewith.

11. A new article of manufacture, an insecticidal spray material embracing an oil and a proportion of effective fatty acid equivalent to a weight of an ammonia soap $\frac{1}{10}$ percent to $\frac{1}{300}$ percent in excess of the weight of soap required to soften the water in which said article is dispersed when applied.

WILLIAM HUNTER VOLCK.